Sept. 1, 1936.    C. H. RICHARDS    2,052,723
THEFTPROOF COMPARTMENT FOR BUILDINGS
Filed June 22, 1935    3 Sheets-Sheet 1
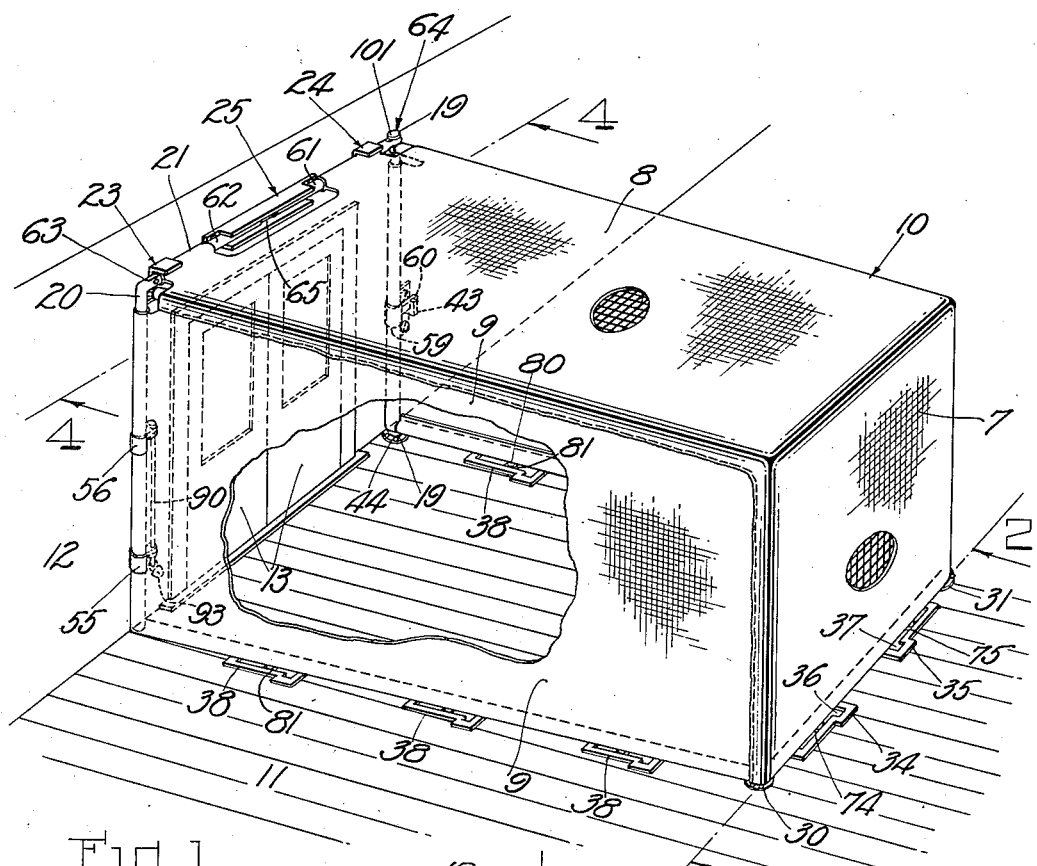
Fig.1
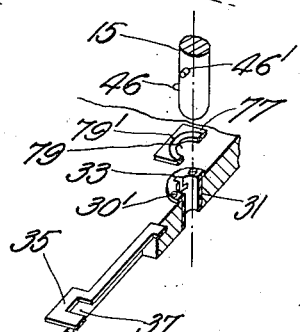
Fig.2
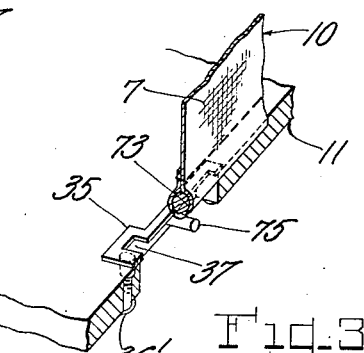
Fig.3
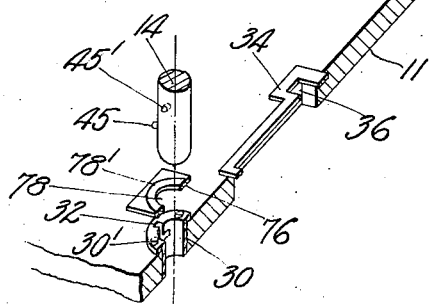
INVENTOR:
Carroll H. Richards
by Dike, Calver and Gray
Attys.

Sept. 1, 1936.  C. H. RICHARDS  2,052,723
THEFTPROOF COMPARTMENT FOR BUILDINGS
Filed June 22, 1935  3 Sheets-Sheet 2
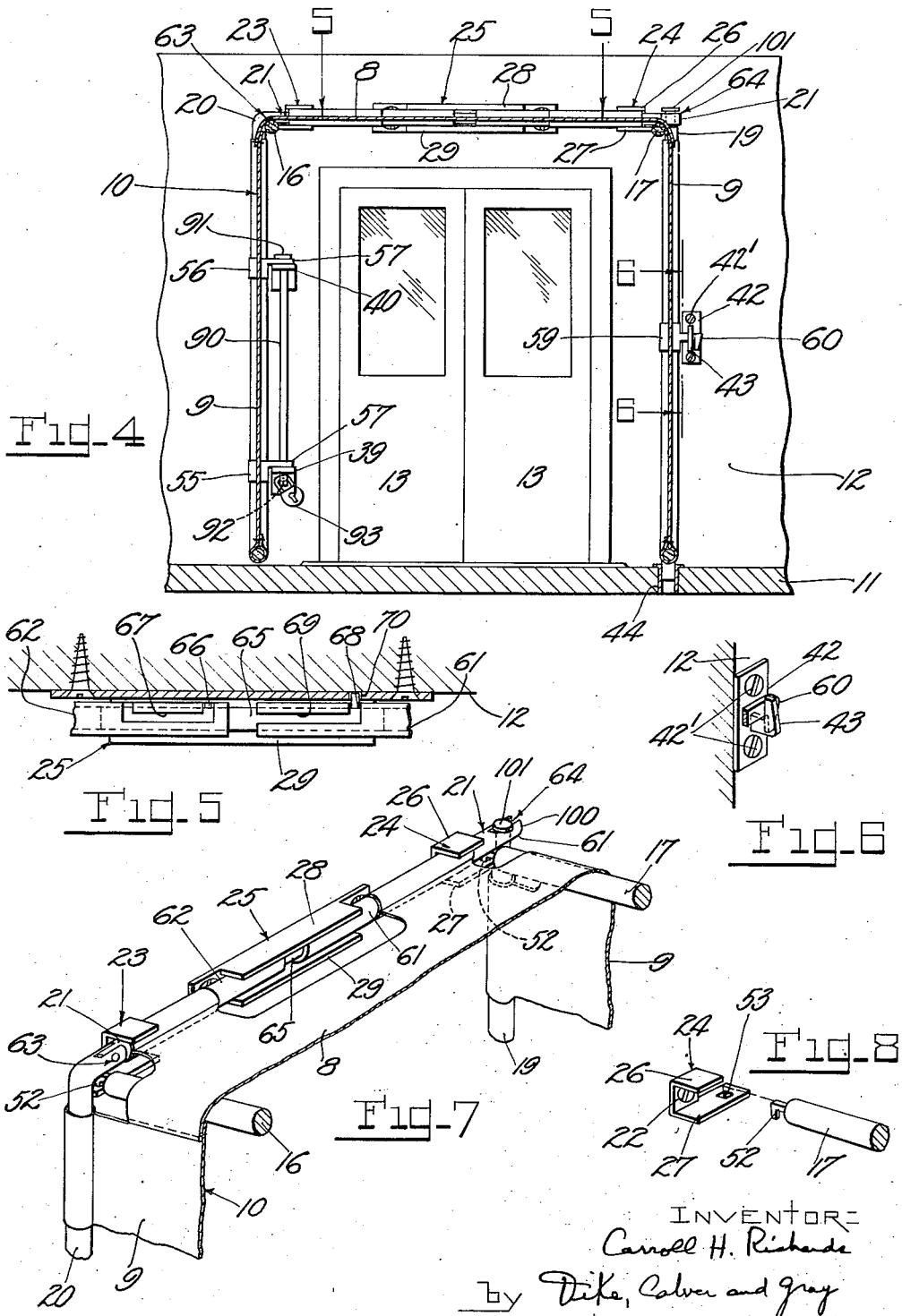

Sept. 1, 1936.   C. H. RICHARDS   2,052,723
THEFTPROOF COMPARTMENT FOR BUILDINGS
Filed June 22, 1935   3 Sheets-Sheet 3
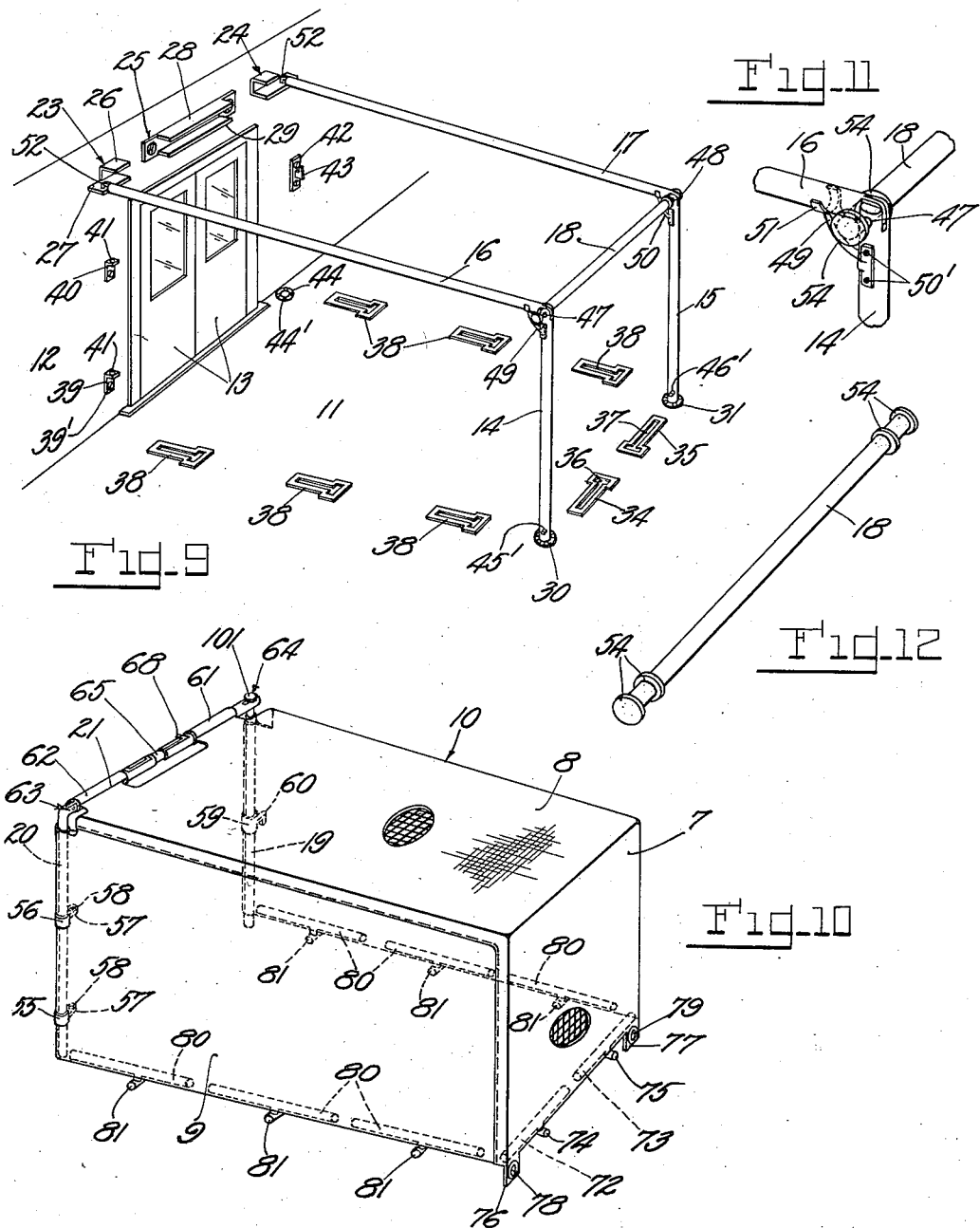

Patented Sept. 1, 1936

2,052,723

UNITED STATES PATENT OFFICE 2,052,723

THEFTPROOF COMPARTMENT FOR BUILDINGS

Carroll H. Richards, Wellesley, Mass.

Application June 22, 1935, Serial No. 27,951

11 Claims. (Cl. 20—1.6)

In the operation of stores, and particularly a group of stores in a given locality, which are supplied with goods from a common warehouse or similar source of supply, it is desirable at times to make deliveries of goods outside of the usual "business" hours in order that the period of delivery may be spread over more time and the delivery facilities, as trucks and men, be more fully and efficiently utilized to the end that the expense of distributing the goods from the warehouse to the stores may be carried on at a minimum cost and a substantial reduction in overhead thus effected. With stores such as grocery stores, for example, with the usual equipment and wherein the goods are displayed around the front of the store it has been found inadvisable to admit delivery crews without the presence of the store manager or a clerk to take care not only of the inventory in the store but to check up the goods delivered, thus insuring that no confusion result and that no loss of inventory will take place.

It has been proposed to provide a fence-like structure for separating a section of the front portion or lobby of the store adjacent the entrance from the remainder so that a trucking or delivery crew may be provided with a pass key to the entrance door and may deliver and deposit merchandise in the front section separated from the remainder of the store. Such a proposal has not met the approval of many store proprietors because it did not afford adequate protection against theft of goods from the store proper by the delivery crew. For example, the delivery crew could scale the fence-like structure by piling boxes or the like adjacent thereto and take small amounts of goods at each time of delivery over a long period of time without the thefts being discovered at least until inventory had been taken.

The present invention contemplates a structure for separating a portion adjacent the entrance to a store from the remainder of the store which will permit delivery of goods between the hours of closing and opening the store for business, the structure being such that the delivery crew cannot gain access to the store proper without it being known at the next opening of the store for business.

Thus, the invention contemplates a portable structure providing with the store floor and wall containing the entrance door a completely enclosed compartment separating the entrance door from the remainder of the store. The structure includes a closure forming the side walls and roof of the compartment and may be made of canvas or other fabric or any light-weight material. Supporting and locking means are provided for supporting the closure in uncollapsed position and for locking it to the store floor and wall. The parts are so arranged and constructed that the structure may be assembled in its operative position and removed therefrom by one man if necessary. Intercommunication between the compartment and the store proper by the delivery crew is impossible unless they break part of the structure and this will be noticed by the proprietor of the store at the beginning of the next business day.

The invention will be more clearly understood from the following description in conjunction with the accompanying drawings: in which, Fig. 1 is a perspective view of a structure embodying the invention;

Fig. 2 is a fragmentary sectional view taken upon the line 2—2 of Fig. 1, illustrating the relationship of certain parts of the structure;

Fig. 3 is a similar sectional view illustrating the relationship of certain other parts of the structure;

Fig. 4 is a sectional view taken upon the line 4—4 of Fig. 1;

Fig. 5 is a sectional view taken upon the line 5—5 of Fig. 4;

Fig. 6 is a sectional view taken upon the line 6—6 of Fig. 4;

Fig. 7 is a fragmentary detail perspective view, partly broken away, of a portion of the structure;

Fig. 8 is a detail perspective view of two cooperating parts of the structure;

Fig. 9 is a perspective view of a skeleton frame forming part of the structure;

Fig. 10 is a perspective view of a collapsible closure forming part of the structure of the invention; and Figs. 11 and 12 are enlarged detail perspective views of portions of the structure shown in Fig. 9.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The embodiment of the invention illustrated in the accompanying drawing comprises a portable collapsible closure 10, the body of which may be made of canvas, fabric or other light-weight material adapted to be supported upon the floor 11 adjacent a wall 12 of a building, such as a store, the wall 12 having an entrance door 13. The floor 11 and the wall 12 provide the bottom or floor and one end wall, respectively, of the compartment of the invention. The closure 10 provides the other end wall 7, the roof 8 and the side walls 9 of the compartment. Preferably, the width and height of the compartment decrease gradually from the wall 12. The support for the closure 10 includes uprights 14 and 15, longitudinal members 16 and 17 and a cross member 18. Uprights 19 and 20 and cross member 21 also form part of the means for supporting the closure 10. As illustrated, the uprights 19 and 20 and the cross member 21 are secured to the edge of the closure 10. The uprights 14 and 15 and the longitudinal members 16 and 17 and the cross member 18 are separate from the closure 10 and are adapted to provide a skeleton frame for receiving the closure 10.

Secured to the wall 12 above the entrance door 13, as by screws 22, are a pair of end brackets 23 and 24 and an intermediate bracket 25. The end brackets 23 and 24 are provided with spaced upper and lower plates 26 and 27 projecting therefrom in parallel horizontal planes. The intermediate bracket 25 also is provided with spaced upper and lower plates 28 and 29 projecting therefrom in spaced horizontal planes. The floor 11 is provided with spaced holes at the corners of the compartment remote from the wall 12 in which hollow cylindrical plates 30 and 31 are fitted and secured by screws 30'. The wall of each of the plates 30 and 31 is provided with L-shaped slots 32 and 33 respectively. A pair of plates 34 and 35 having T-shaped slots 36 and 37, respectively, are secured by screws 36' upon the floor 11 over suitable openings therein and are positioned between and in alinement with the cylindrical plates 30 and 31. A plurality of similar slotted plates 38 are secured in the floor 11 in spaced relation directly below the side walls 9 of the compartment. A pair of brackets 39 and 40 are secured by screws 39' in spaced relation upon the wall 12 and below the end bracket 23 and each is provided with an opening 41. A bracket 42 having an upwardly extending hook 43 is secured by screws 42' in the wall 12 below the end bracket 24. A hollow cylindrical plate 44 is fitted in an opening in the floor 11 adjacent the wall 12 and beneath the end bracket 24 and is secured to the floor by screws 44'.

The cylindrical plates 30, 31 and 44 are adapted to receive the lower end of the uprights 14, 15 and 19, respectively. Pins 45 and 46 are secured in the uprights 14 and 15 adjacent the lower end thereof so as to extend laterally therefrom and engage the L-shaped slots 32 and 33, respectively, in the plates 30 and 31. Pins 45' and 46' longer than the pins 45 and 46 are secured in the uprights 14 and 15 respectively slightly above the pins 45 and 46. Hinge connections 47 and 48 are provided between the upper ends of the uprights 14 and 15 and one end of the longitudinal members 16 and 17. Brackets 49 and 50 are secured by screws 50' near the upper ends of the uprights 14 and 15 and are provided with forked bearings 51 adapted to support the longitudinal members 16 and 17. The other ends of the longitudinal members 16 and 17 are provided with hooks 52 adapted to be received in openings 53 formed in the lower plates 27 of the brackets 23 and 24. Each end of the cross member 18 is provided with a pair of spaced collars 54 to receive the brackets 49 and 50 therebetween. The upright 20 is provided with a pair of spaced collars 55 and 56 each having a projecting ear 57 provided with an opening 58. A rod 90 having a head 91 (Fig. 4) is adapted to pass through openings 41 and 58 and lock the collars 55 and 56 to the brackets 39 and 40. The rod 90 is provided with an opening 92 near its lower end to receive a padlock 93. The upright 19 is provided with a collar 59 having a projecting hook 60. The cross member 21 comprises two alined hollow parts 61 and 62 which are connected by hinge connection 63 and the connection 64 to the upper ends of the uprights 20 and 19, respectively. The connection 64 is formed by engaging the slotted or forked end 100 of the part 61 with the portion 101 of the upright 19. The portion 101 is of reduced cross section and slightly spaced from the upper end of the upright. The adjacent ends of the parts 61 and 62 are connected by a rod 65 adapted to be slidably received therein. The rod 65 is provided with a pin 66 adapted to move in a U-shaped slot 67 in the member 62, thus providing a permanent slidable connection between the rod 65 and member 62. The rod 65 is also provided with a pin 68 adapted to move in an L-shaped slot 69 in the member 61. The bracket 25 is provided with a hole 70 intermediate the plates 28 and 29 adapted to receive the pin 68 when the cross member 21 is in its assembled position.

A pair of bars 72 and 73 are secured in spaced relation in the bottom edge of the portion of the closure 10 forming the end wall 7 of the compartment. The bars 72 and 73 are provided with T-shaped depending keys 74 and 75, respectively, adapted to be received in the T-shaped slots 36 and 37 in the plates 34 and 35, respectively. The closure 10 is also provided with a pair of flaps 76 and 77 having openings 78 and 79 adapted to receive the uprights 14 and 15, respectively. Preferably, flanged metal rings 78' and 79' are fitted in the openings 78 and 79 respectively. A plurality of bars 80 are secured in spaced relation at the bottom of those portions of the closure 10 forming the side walls 9 of the compartment. Each of the bars 80 is provided with a T-shaped key 81 adapted to be received in the T-shaped slot in the plates 38.

In assembling the structure of the invention to provide a completely enclosed compartment adjacent the entrance of a building, as shown in Fig. 1, the portions 61 and 62 of the cross member 21 are connected by inserting the rod 65, which is slidably carried by portion 62, into the member 61 and turning the rod 65 so as to bring the pins 66 and 68 into engagement with the angularly disposed portions of the slots 67 and 69 at the right hand end thereof as viewed in Fig. 5. The keys 74 and 75 are then inserted in the T-shaped slots 36 and 37 in the plates 34 and 35 respectively. The flaps 76 and 77 are then turned in and positioned over the cylindrical plates 30 and 31, respectively. The lower ends of the uprights 14 and 15 are inserted through the openings 78 and 79 of the flaps 76 and 77, respectively, and are locked to the cylindrical plates 30 and 31, respectively, by the pins 45 and 46 engaging the angularly disposed portions of the slots 32 and 33. The pins 45' and 46' extend over and engage the flaps 76 and 77. The cross member 18 is now positioned between the uprights 14 and 15 so that the bracket 49 is positioned between one pair of spaced collars 54 on the cross member and the bracket 50 is positioned between the other pair of spaced collars 54.

The longitudinal members 16 and 17 are now moved about their hinge connections 47 and 48 and the hooks 52 are brought into engagement with the openings 53 in the end brackets 23 and 24. The frame structure formed by the uprights 19 and 20 and the cross member 21 is now brought into position to straddle the skeleton structure formed by the uprights 14 and 15, the longitudinal members 16 and 17 and cross member 18 and is gradually moved so as to bring the closure 10 to the position shown in Fig. 1 with the cross member 21 positioned between the spaced plates of the brackets 23, 24 and 25. When the cross member 21 is so positioned, the pin 68 upon the member 65 will engage the opening 70 in the bracket 25 thus preventing relative movement between the member 65 and the two parts of the cross member 21. As the closure 10 is thus moved, the keys 81 upon the rods 80 are inserted in the T-shaped slots in the plates 38. As the upright 19 is brought to its position adjacent the wall 12, its lower end is inserted in the opening in the cylindrical plate 44 and the hook 60 is brought into engagement with the hook 43. As the upright 20 is moved to its position adjacent the wall 12, the cross member 21 is positioned between the spaced plates of the brackets 23, 24 and 25 and the ears 57 on the collars 55 and 56 are brought to a position directly above the openings 41 in the brackets 39 and 40 and the rod 90 is inserted through the openings 58 and 41 and is locked in place by the padlock 93. It will be noted that when the parts are thus assembled and locked they cannot be disassembled without first removing the padlock 93. Consequently, it is impossible to gain entrance to the building proper from the interior of the compartment without breaking or damaging the compartment structure in some way and thus leaving evidence of the entrance.

I claim:

1. A structure adapted to form a completely enclosed compartment with the floor and one wall of a building comprising a collapsible closure adapted to form the remaining walls and roof of the compartment, means for supporting said closure in its uncollapsed position, means for detachably securing said supporting means to the floor and wall of the building, means for detachably securing said closure to said floor and the wall of the building and for preventing movement of said supporting means to detach the same from the building, and locking means for preventing detachment of the means for securing said closure to said building.

2. A structure adapted to form a completely enclosed compartment with the floor and one wall for the building comprising a collapsible closure adapted to form the remaining walls and roof of the compartment, collapsible means for supporting said closure in its uncollapsed position, means for detachably securing said supporting means in its uncollapsed position to the floor and wall of the building, means for detachably securing said closure to said floor and the wall of the building and for preventing movement of said supporting means to detach the same from the building, and locking means for preventing detachment of the means for securing said closure to said building.

3. A structure adapted to form a completely enclosed compartment with the floor and one wall for the building comprising a collapsible closure adapted to form the remaining walls and roof of the compartment, means for supporting said closure in its uncollapsed position, means for detachably securing said supporting means to the floor and wall of the building, said means for detachably securing said supporting means to the floor and wall of the building being so arranged that movement of said supporting means to detach the same from one part of the building is prevented when the supporting means is detachably secured to the other part of the building, means for detachably securing said closure to said floor and the wall of the building and for preventing movement of said supporting means to detach the same from the building, and locking means for preventing detachment of the means for securing said closure to said building.

4. A structure adapted to form a completely enclosed compartment with the floor and one wall of a building comprising a collapsible closure adapted to form the roof and remaining walls of the compartment, means for detachably securing said closure to said floor, means for supporting said closure in its uncollapsed position, means for detachably securing said supporting means to said wall and floor of the building, means for detachably securing said closure to the wall of the building and for preventing detachment of said supporting means, said last mentioned means and said supporting means cooperating to prevent movement of said closure to detach the same from said floor, and locking means for preventing detachment of said means for securing the closure to the wall of the building.

5. A structure adapted to form a completely enclosed compartment with the floor and one wall of a building comprising a collapsible closure adapted to form the roof and remaining walls of the compartment, means for detachably securing said closure to said floor, means for supporting said closure in its uncollapsed position, means for detachably securing said supporting means to said floor and wall of the building, a frame adapted to engage said supporting means to prevent detachment of the latter, said frame extending along the free edge of the roof and walls formed by said closure and being connected thereto, means for detachably securing said frame to the wall of the building, said frame and said supporting means cooperating to prevent movement of said closure to detach the same from said floor, and locking means for preventing detachment of said frame from the building.

6. A structure adapted to form a completely enclosed compartment with the floor and one wall of the building comprising a collapsible closure adapted to form the roof and remaining walls of the compartment, means for detachably securing said closure to said floor, a collapsible support for supporting said closure in its uncollapsed position, means for detachably securing said support in its uncollapsed position to said wall and floor of the building, means for detachably securing said closure to the wall of the building and for preventing detachment of said supporting means, said last mentioned means and said supporting means cooperating to prevent movement of said closure to detach the same from said floor, and locking means for preventing detachment of said means for securing the closure to the wall of the building.

7. A structure adapted to form a completely enclosed compartment with the floor and one wall of a building comprising a collapsible closure adapted to form the roof and remaining walls of the compartment, means for detachably securing said closure to said floor, means for supporting said closure in its uncollapsed position, means for detachably securing said supporting means to the floor and wall of the building, a frame adapted to engage said supporting means to prevent detachment of the latter, said frame having upright members secured to the free edge of the walls formed by said closure and connected by a collapsible cross member secured to the free edge of the roof formed by said closure, means for detachably securing said frame with said cross member in its uncollapsed position to the wall of the building, said frame and said supporting means cooperating to prevent movement of said closure to detach the same from said floor, and locking means for preventing detachment of said frame from the building.

8. A structure adapted to form a completely enclosed compartment with the floor and one wall of a building comprising a collapsible closure adapted to form the roof and remaining walls of the compartment, means for detachably securing said closure to said floor, a collapsible support for supporting said closure in its uncollapsed position, means for detachably securing said support in its uncollapsed position to said wall and the floor of the building, a frame adapted to engage said support to prevent detachment of the latter, said frame having upright members secured to the free edge of the walls formed by said closure and connected by a collapsible cross member secured to the free edge of the roof formed by said closure, means for detachably securing said frame with said cross member in its uncollapsed position to the wall of the building, said frame and said support cooperating to prevent movement of said closure to detach the same from said floor, and locking means for preventing detachment of said frame from the building.

9. A structure adapted to form a completely enclosed compartment with the floor and one wall of a building comprising a collapsible closure adapted to form the roof and remaining walls of the compartment, means for detachably securing said closure to said floor, means for supporting said closure in its uncollapsed position, means for detachably securing said supporting means to said wall and floor of the building, means for detachably securing said closure to the wall of the building and for preventing detachment of said supporting means, said last mentioned means and said supporting means cooperating to prevent movement of said closure to detach the same from said floor, and locking means for preventing detachment of said means for securing the closure to the wall of the building, said supporting means comprising laterally spaced supports each including an upright and a longitudinal member pivotally connected thereto.

10. A structure adapted to form a completely enclosed compartment with the floor and one wall of a building comprising a collapsible closure adapted to form the roof and remaining walls of the compartment, means for detachably securing said closure to said floor, means for supporting said closure in its uncollapsed position, a frame adapted to engage said supporting means to prevent detachment of the latter, said frame having upright members secured to the free edge of the walls formed by said closure and connected by a collapsible cross member secured to the free edge of the roof formed by said closure, means for detachably securing said frame with said cross member in its uncollapsed position to the wall of the building, said frame and said supporting means cooperating to prevent movement of said closure to detach the same from said floor, and locking means for preventing detachment of said frame from the building, said supporting means comprising laterally spaced supports each including an upright and a longitudinal member pivotally connected thereto, a cross member adapted to connect said supports, and means adapted to detachably connect said cross member and supports when one of the parts of each of said supports is moved relative to the other out of its supporting relation, said last means being adapted to prevent detachment of said cross member when said parts of said supports are returned to their supporting relation.

11. A structure adapted to form a completely enclosed compartment with the floor and one wall of a building comprising a collapsible closure adapted to form the remaining walls and roof of the compartment, means for supporting said closure in its uncollapsed position, means for detachably securing said supporting means in its supporting position, detachable means for securing said closure to the building and for preventing detachment of the said supporting means, and locking means for preventing detachment of the means for securing said closure to the building.

CARROLL H. RICHARDS.